United States Patent
Baker

(10) Patent No.: US 11,142,476 B2
(45) Date of Patent: Oct. 12, 2021

(54) BURNER FOR SUBMERGED COMBUSTION MELTING

(71) Applicant: JOHNS MANVILLE, Denver, CO (US)

(72) Inventor: John Wayne Baker, Golden, CO (US)

(73) Assignee: Johns Manville, Denver, CO (US)

( * ) Notice: Subject to any disclaimer, the term of this patent is extended or adjusted under 35 U.S.C. 154(b) by 61 days.

(21) Appl. No.: 14/785,327

(22) PCT Filed: May 22, 2013

(86) PCT No.: PCT/US2013/042159
§ 371 (c)(1),
(2) Date: Oct. 17, 2015

(87) PCT Pub. No.: WO2014/189502
PCT Pub. Date: Nov. 27, 2014

(65) Prior Publication Data
US 2016/0075587 A1 Mar. 17, 2016

(51) Int. Cl.
*C03B 5/235* (2006.01)
*F23D 14/78* (2006.01)

(52) U.S. Cl.
CPC .......... *C03B 5/2356* (2013.01); *C03B 5/2353* (2013.01); *F23D 14/78* (2013.01);
(Continued)

(58) Field of Classification Search
CPC ........................... C03B 5/2356; C03B 2211/60
See application file for complete search history.

(56) References Cited

U.S. PATENT DOCUMENTS 1,706,857 A 3/1929 Mathe
1,945,695 A * 2/1934 Kingsley ................. C03B 13/12
65/50

(Continued)

FOREIGN PATENT DOCUMENTS

CN 202329916 U 7/2012
DE 37 10 244 A1 6/1989
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — John M Hoffmann
(74) *Attorney, Agent, or Firm* — Robert D. Touslee

(57) ABSTRACT

Submerged combustion burners having a burner body and a burner tip body connected thereto. The burner body has an external conduit and a first internal conduit substantially concentric therewith. The external conduit and first internal conduit form an annulus for passing a cooling fluid there between. A second internal conduit substantially concentric with the external conduit forms a second annulus between the first and second internal conduits. A burner tip body is connected to the burner body at ends of the external and first internal conduits. The burner tip body includes a generally central flow passage for a combustible mixture, the flow passage defined by an inner wall of the burner tip body. The burner tip body further has an outer wall and a crown connecting the inner and outer walls. The crown includes at least one physical convolution sufficient to increase surface area and fatigue resistance of the crown.

5 Claims, 13 Drawing Sheets

(52) U.S. Cl.
CPC ....... *C03B 2211/22* (2013.01); *C03B 2211/60* (2013.01); *F23D 2214/00* (2013.01)

(56) References Cited

U.S. PATENT DOCUMENTS

| | | | |
|---|---|---|---|
| 2,174,533 A | 10/1939 | See et al. | |
| 2,118,479 A | 1/1940 | McCaskey | |
| 2,269,459 A | 1/1942 | Kleist | |
| 2,321,480 A | 6/1943 | Gaskell | |
| 2,432,942 A | 12/1947 | See et al. | |
| 2,455,907 A | 1/1948 | Slayter | |
| 2,679,749 A | 6/1954 | Poole | |
| 2,718,096 A | 9/1955 | Henry et al. | |
| 2,773,545 A | 12/1956 | Petersen | |
| 2,781,756 A | 2/1957 | Kobe | |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,160,578 A | 12/1964 | Saxton et al. | |
| 3,165,452 A | 1/1965 | Williams | |
| 3,170,761 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,237,929 A | 3/1966 | Plumat et al. | |
| 3,241,548 A | 3/1966 | See et al. | |
| 3,248,205 A | 4/1966 | Dolf et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,339,616 A | 5/1967 | Ward, Jr. et al. | |
| 3,325,298 A | 6/1967 | Brown | |
| 3,347,660 A | 10/1967 | Smith et al. | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,421,873 A | 1/1969 | Burgman et al. | |
| 3,432,399 A | 3/1969 | Schutt | |
| 3,445,214 A | 5/1969 | Oremesher | |
| 3,498,779 A | 3/1970 | Hathaway | |
| 3,510,393 A | 5/1970 | Burgman et al. | |
| 3,525,670 A | 8/1970 | Barnebey | |
| 3,533,770 A | 10/1970 | Adler et al. | |
| 3,563,683 A | 2/1971 | Hess | |
| 3,592,151 A | 7/1971 | Webber | |
| 3,592,623 A | 7/1971 | Shepherd | |
| 3,606,825 A | 9/1971 | Johnson | |
| 3,617,234 A | 11/1971 | Hawkins et al. | |
| 3,627,504 A | 12/1971 | Johnson et al. | |
| 3,692,017 A | 9/1972 | Glachant et al. | |
| 3,717,139 A | 2/1973 | Guillet et al. | |
| 3,738,792 A | 6/1973 | Feng | |
| 3,746,527 A | 7/1973 | Knavish et al. | |
| 3,747,588 A | 7/1973 | Malmin | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,818,893 A | 6/1974 | Kataoka et al. | |
| 3,835,909 A | 9/1974 | Douglas et al. | |
| 3,840,002 A | 10/1974 | Douglas et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,083,711 A | 4/1978 | Jensen | |
| 4,097,028 A | 6/1978 | Langhammer | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,226,564 A | 10/1980 | Takahashi et al. | |
| 4,238,226 A | 12/1980 | Sanzenbacher et al. | |
| 4,249,927 A | 2/1981 | Fukuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,323,718 A | 4/1982 | Buhring et al. | |
| 4,349,376 A | 9/1982 | Dunn et al. | |
| 4,406,683 A | 9/1983 | Demarest | |
| 4,413,882 A | 11/1983 | Bailey et al. | |
| 4,488,537 A | 12/1984 | Laurent | |
| 4,539,034 A | 9/1985 | Hanneken | |
| 4,542,106 A | 9/1985 | Sproull | |
| 4,545,800 A | 10/1985 | Won et al. | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,735,642 A | 4/1988 | Jensen et al. | |
| 4,738,938 A | 4/1988 | Kunkle et al. | |
| 4,758,259 A | 7/1988 | Jensen | |
| 4,798,616 A | 1/1989 | Knavish et al. | |
| 4,814,387 A | 3/1989 | Donat | |
| 4,816,056 A | 3/1989 | Tsai et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,919,700 A | 4/1990 | Pecoraro et al. | |
| 4,927,886 A | 5/1990 | Backderf et al. | |
| 4,953,376 A | 9/1990 | Merlone | |
| 5,032,230 A | 7/1991 | Shepherd | |
| 5,052,874 A | 10/1991 | Johanson | |
| 5,062,789 A | 11/1991 | Gitman | |
| 5,067,975 A * | 11/1991 | Backer | C03B 37/014 501/10 |
| 5,097,802 A | 3/1992 | Clawson | |
| 5,168,109 A | 12/1992 | Backderf et al. | |
| 5,169,424 A | 12/1992 | Grinnen et al. | |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,449,286 A | 9/1995 | Snyder et al. | |
| 5,483,548 A | 1/1996 | Coble | |
| 5,490,775 A | 2/1996 | Joshi et al. | |
| 5,522,721 A | 6/1996 | Drogue et al. | |
| 5,545,031 A | 8/1996 | Joshi et al. | |
| 5,575,637 A | 11/1996 | Slavejkov et al. | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,736,476 A | 4/1998 | Warzke et al. | |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |

(56) References Cited

U.S. PATENT DOCUMENTS

| | | |
|---|---|---|
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdal |
| 2005/0236747 A1* | 10/2005 | Rue .................. C03B 5/2356 266/217 |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0250818 A1* | 10/2008 | Shen .................. C03B 37/083 65/496 |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |

(56) References Cited

U.S. PATENT DOCUMENTS

| | | |
|---|---|---|
| 2012/0077135 A1 | 3/2012 | Charbonneau |
| 2012/0132725 A1 | 5/2012 | Dinu |
| 2012/0122490 A1 | 9/2012 | Cole et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |

FOREIGN PATENT DOCUMENTS

| | | |
|---|---|---|
| DE | 196 19 919 A1 | 8/1997 |
| DE | 100 29 983 C2 | 9/2003 |
| DE | 103 27 201 A1 | 1/2005 |
| DE | 10 2005 033330 B3 | 8/2006 |
| DE | 10 2006 006572 A1 | 7/2009 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 A | 5/1921 |
| IT | 1208172 | 7/1989 |
| JP | S58 199728 A | 11/1983 |
| JP | S61 9901 7 A | 5/1986 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Furman, BJ, ME 120 Experimental Methods Vibration Measurement, San Jose University Department of Mechanical and Aerospace Engineering.

Higley, Ba, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Oblain, V.M. et al., "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

BURNER FOR SUBMERGED COMBUSTION MELTING

CROSS-REFERENCE TO RELATED APPLICATIONS

This application is related to Applicant's International Application Numbers PCT/US13/42153 and PCT/US13/42147, filed on even date herewith, which are incorporated herein by reference.

BACKGROUND INFORMATION

Technical Field

The present disclosure relates generally to the field of combustion burners and methods of use, and more specifically to burners, submerged combustion melters, and methods of their use, particularly for melting glass forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence and foaming.

Oxy-fuel burners have been used for many years in the glass industry in general especially in the fiberglass, TV glass, and container glass industry segments. In the context of SCMs, known oxy-fuel burners are predominately water-cooled, nozzle mix designs and avoid premixing for safety reasons due to the increased reactivity of using oxygen as the oxidant versus air. One currently used submerged combustion burner employs a smooth exterior surface, half-toroid burner tip, such as shown in the photograph of FIG. 1. As may be seen in the photograph, used burner tips of this design frequently exhibit numerous cracks and may fail prematurely. The burner tip is the most exposed component of the SC burner, and must endure the extreme and continuously variable thermal and stress conditions brought about by the molten glass, "relatively cold" fuel and oxygen, high-temperature flame front, hot combustion products, cooling water, mechanical load from molten glass turbulence, and load from internal water pressure.

Metallurgical analysis has shown that the cracks on the smooth half-toroid burner tips frequently initiate at the exterior surface, generally oriented perpendicular to the stress direction, and are a result of thermal fatigue during operation. The fatigue failure lines shown in the photograph of FIG. 1 illustrate primarily a radial crack alignment direction, indicating primarily circumferential stress in the burner tip from thermal contraction and expansion. Therefore, alleviating or reducing these circumferential thermal contraction and expansion stresses in the burner tip may have significant favorable impact on the life of the burner tip.

Development of submerged combustion burners having less susceptibility to stress and thermal fatigue while melting glass-forming materials would be an advance in the submerged combustion art.

SUMMARY

In accordance with the present disclosure, submerged combustion (SC) burners, melters including at least one of the submerged combustion burners, and methods of using the melters to produce molten glass are described that may reduce or eliminate problems with known SC burners, melters, and methods.

A first aspect of the disclosure is a fluid-cooled burner comprising:

a burner body comprising an external conduit and a first internal conduit substantially concentric with the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with the external conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits; and a burner tip body connected to the burner body at the first ends of the external and first internal conduits, the burner tip body comprising a generally central flow passage configured to pass a combustible mixture therethrough, the generally central flow passage defined by an inner wall of the burner tip body, the burner tip body further comprising an outer wall and a crown connecting the inner and outer walls, the crown comprising at least one physical convolution sufficient to increase surface area and fatigue resistance of the crown compared to a smooth, half-toroid crown of the same composition.

A second aspect of the disclosure is a submerged combustion melter comprising:

a floor, a roof, and a sidewall structure connecting the floor and roof defining an internal space, at least a portion of the internal space comprising a melting zone; and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone, at least one of the combustion burners being a fluid-cooled combustion burner, the burner body comprising the features described herein, the burner body having a burner tip body connected thereto as also described, the burner tip body comprising an outer wall and a crown connecting the inner and outer walls, the crown comprising at least one physical convolution sufficient to increase surface area and fatigue resistance of the crown compared to a smooth, half-toroid crown of the same composition.

A third aspect of the disclosure are methods of producing molten glass, comprising:

a) flowing a cooling fluid through a first annulus in a burner body, the burner body comprising the features described herein, the burner body having a burner tip body connected thereto as also described, the burner tip body comprising an outer wall and a crown connecting the inner and outer walls, the crown comprising at least one physical convolution sufficient to increase surface area and fatigue resistance of the crown compared to a smooth, half-toroid crown of the same composition;

b) flowing an oxidant into the one or more oxidant inlet ports and through the second annulus;

c) flowing a fuel into the one or more fuel inlet ports and through the second inner conduit, the burner body and burner tip body configured such that flow of oxidant out of the second annulus and flow of fuel out of the second internal conduit causes the oxidant to intersect flow of the fuel in a mixing region at least partially defined by the generally central flow passage through the burner tip body;

d) combusting at least some of the fuel in the mixing region to form a flame and combustion gases; and e) directing the flame and combustion gases into partially molten glass forming materials above the mixing region.

A fourth aspect of this disclosure are methods of producing molten glass comprising:

a) flowing a cooling fluid through a first annulus in a burner body, the burner body comprising the features described herein, the burner body having a burner tip body connected thereto as also described, the burner tip body comprising an outer wall and a crown connecting the inner and outer walls, the crown comprising at least one physical convolution sufficient to increase surface area and fatigue resistance of the crown compared to a smooth, half-toroid crown of the same composition;

b) flowing a fuel into the one or more fuel inlet ports and through the second annulus;

c) flowing an oxidant into the one or more oxidant inlet ports and through the second inner conduit, the burner body and burner tip body configured such that flow of oxidant out of the second inner conduit and flow of fuel out of the second annulus causes the oxidant to intersect flow of the fuel in a mixing region at least partially defined by the generally central flow passage through the burner tip body;

d) combusting at least some of the fuel in the mixing region to form a flame and combustion gases; and e) directing the flame and combustion gases into partially molten glass forming materials above the mixing region.

Certain methods within the disclosure include methods wherein the fuel may be a substantially gaseous fuel, the substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
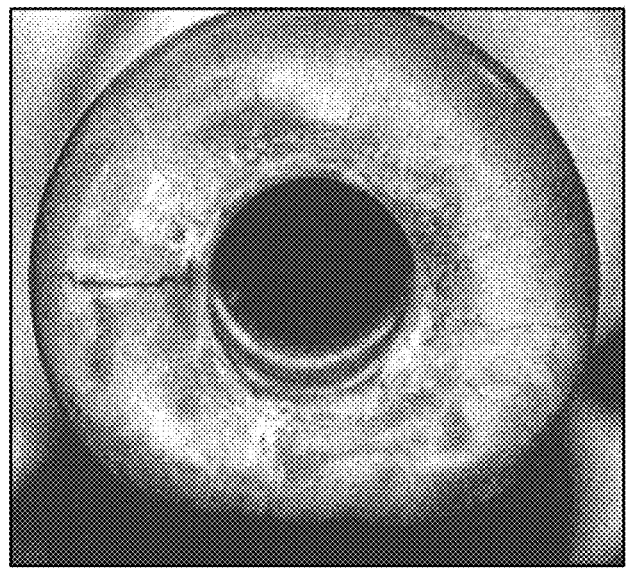
FIG. 1 is a photographic plan view of a prior art burner tip, showing damage.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to present SCMs, and in particular SC burners, is that burner tips of presently used SC burners frequently exhibit numerous cracks and may fail prematurely, since the burner tip is the most exposed component of the SC burner, and must endure the extreme and continuously variable thermal and stress conditions in the melting zone of the SCM. Therefore, alleviating or reducing these circumferential thermal contraction and expansion stresses, and/or other directional stresses in the burner tip may have significant favorable impact on the life of the burner tip.

It has now been discovered that certain burner tip modifications may reduce or eliminate such shortcomings.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Conduits, burner bodies, burner tips and associated components (such as spacers and supports between conduits) used in SC burners, SCMs and processes of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Burner tips may comprise noble metals or other exotic corrosion and/or fatigue-resistant materials, and may be attached to the base metals comprising the burner body using a variety of techniques, such as brazing, flanged fittings, interference fittings, and the like. Suitable materials for the glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry, and type of glass to be produced, may dictate the choice of a particular material, among other parameters.

The phrase "at least one physical convolution sufficient to increase surface area and fatigue resistance of the crown compared to a smooth, half-toroid crown of the same composition" means one or more structural features in the crown that introduce intricacy so that the crown is able to expand and contract circumferentially and/or radially. The convolutions or intricacies may have any operable shape, for example, at least one or a plurality of generally radial crown physical convolutions extending away from the generally central flow passage. The plurality of generally radial physical convolutions may form a series of alternating ridges and troughs. The series of alternating ridges and troughs may form a crown radial cross-section having a repetitive and/or periodic shape such as, but not limited to, repeating hemispheres, repeating trapezoids, repeating triangles, sinusoidal, repeating irregular shapes, repeating rectangles, sawtooth, and combinations thereof. Another example would be at least one generally non-radial crown physical convolution. Possible generally non-radial crown physical convolutions include, but are not limited to, at least one generally circumferential crown physical convolution, at least one generally spiral crown physical convolution, at least one randomly positioned convolution, at least one non-randomly positioned convolution, and combinations thereof. The at least one non-randomly positioned convolution may comprise a plurality of non-randomly spaced and non-randomly shaped depressions selected from the group consisting of a single row of oblique oval depressions, a single row of chevron depressions, a double row of oblique oval depressions, and combinations thereof. The at least one generally circumferential crown physical convolution may comprises at least one convolution positioned at the connection of the burner tip body to the external and first internal conduits.

In certain embodiments, the at least one convolution may be superimposed on a burner tip body crown having a generally half-toroidal shape, the crown having a longitudinal cross-section that may be hemispherical, trapezoidal, triangular, inverted triangular, irregular, rectangular, and the like.

Certain embodiments may comprise a burner tip insert shaped substantially the same as but smaller than the burner tip body and positioned in an internal space defined by the burner tip body, the insert configured so that a cooling fluid may pass between internal surfaces of the burner tip body and an external surface of the insert. These embodiments may include a third internal conduit generally concentric with the external conduit and positioned between the external and the first internal conduits. A first end of the third internal conduit would be attached to the insert.

In certain embodiments, the inner and outer walls of the burner tip body may extend beyond the first end of the second internal conduit, at least partially defining a mixing region for oxidant and fuel.

The term "fluid-cooled" means use of a coolant fluid (heat transfer fluid) to transfer heat away from the burner exterior conduit and burner tip. Heat transfer fluids may be any gaseous, liquid, or some combination of gaseous and liquid compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more burners in the SCM and/or flow channel(s) downstream thereof may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

Certain SCMs and/or flow channels may employ one or more high momentum, non-submerged burners, for example, to impinge on portions of a foam layer. High momentum burners useful in apparatus, systems, and methods of this disclosure include those disclosed in Applicant's co-pending U.S. patent application Ser. No. 13/268,130, filed Oct. 7, 2011, now U.S. Pat. No. 9,021,838, issued May 5, 2015. As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain SCMs and method embodiments of this disclosure may include fluid-cooled panels such as disclosed in Applicant's co-pending U.S. patent application Ser. No. 12/817,754, filed Jun. 17, 2010, now U.S. Pat. No. 8,769,992, issued Jul. 8, 2014. In certain system and process embodiments, the SCM may include one or more adjustable flame submerged combustion burners comprising one or more oxy-fuel combustion burners, such as described in Applicant's co-pending U.S. patent application Ser. No. 13/268,028, filed Oct. 7, 2011, now U.S. Pat. No. 8,875,544, issued Nov. 4, 2014. In certain systems and processes, the SCM may comprise a melter exit structure designed to minimize impact of mechanical energy, such as described is Applicant's co-pending U.S. patent application Ser. No. 13/458,211, filed Apr. 27, 2012, now U.S. Pat. No. 9,145,319, issued Sep. 29, 2015. In certain systems and processes, the flow channel may comprise a series of sections, and may comprise one or more skimmers and/or impingement (high momentum) burners, such as described in Applicant's co-pending U.S. patent application Ser. No. 13/268,130, filed Oct. 7, 2011, now U.S. Pat. No. 9,021,838, issued May 5, 2015, and U.S. Ser. No. 13/493,170, filed Jun. 11, 2012, now U.S. Pat. No. 8,707,739, issued Apr. 29, 2014. Certain systems and processes of the present disclosure may utilize measurement and control schemes such as described in Applicant's co-pending U.S. patent application Ser. No. 13/493,219, filed Jun. 11, 2012, now U.S. Pat. No. 9,096,453, issued Aug. 4, 2015, and/or feed batch densification systems and methods as described in Applicant's co-pending U.S. patent application Ser. No. 13/540,704, filed Jul. 3, 2012, now U.S. Pat. No. 9,643,869, issued May 9, 2017. Certain SCMs and processes of the present disclosure may utilize devices for delivery of treating compositions such as disclosed in Applicant's co-pending U.S. patent application Ser. No. 13/633,998, filed Oct. 3, 2012, now U.S. Pat. No. 8,973,405, issued Mar. 10, 2015.

Certain SCMs and process embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and processes of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

Specific non-limiting SCM and process embodiments in accordance with the present disclosure will now be presented in conjunction with FIGS. 1-15. The same numerals are used for the same or similar features in the various figures. In the views illustrated in FIGS. 2-13, it will be understood in each case that the figures are schematic in nature, and certain conventional features are not illustrated in order to illustrate more clearly the key features of each embodiment.

Figure 2:
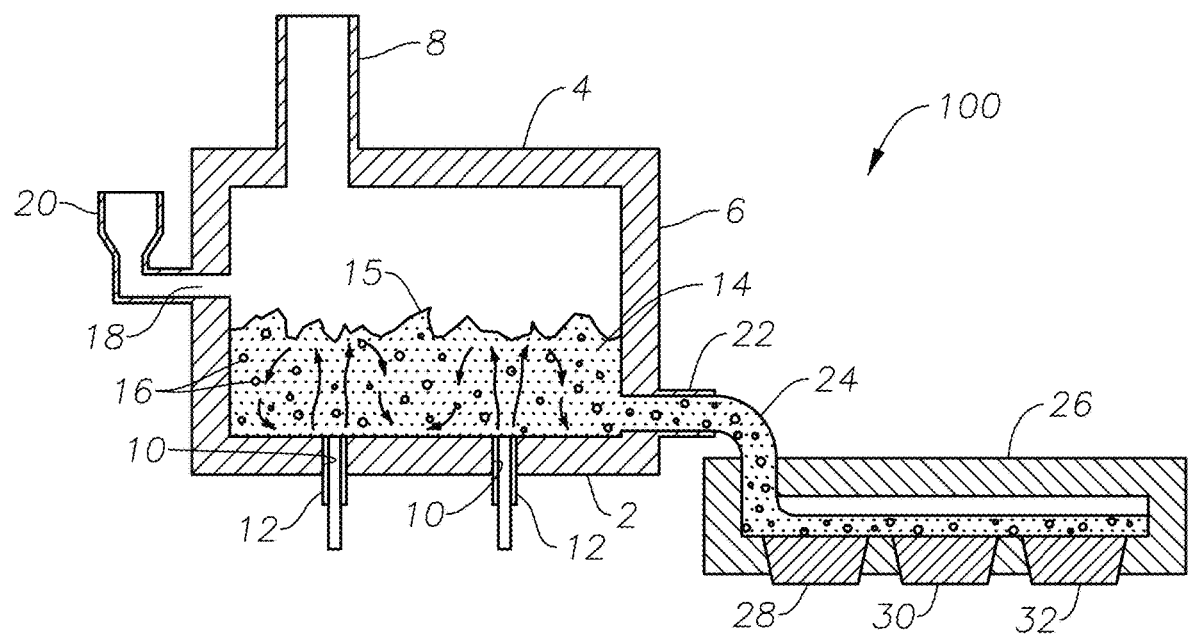
FIG. 2 is schematic longitudinal cross-sectional view of one embodiment of an SCM employing at least one SC burner in accordance with the present disclosure, the SCM producing molten glass flowing to a downstream glass forming apparatus.

Referring now to the figures, FIG. 2 illustrates system embodiment 100 comprising an SCM having a floor 2, a roof or ceiling 4, a wall 6 having a feed opening 18, and a feeder 20 for feeding batch, cullet, waste material, or combination thereof. System embodiment 100 further includes an exhaust stack 8, and openings 10 for two (or more, not illustrated) floor-mounted and/or sidewall-mounted submerged combustion burners 12, which create during operation a highly turbulent melt indicated at 14, with a turbulent surface 15. In certain embodiments, floor-mounted burners 12 may be positioned to emit combustion products into molten glass in the melting zone 14 in a fashion so that the gases penetrate the melt generally perpendicularly to floor 2. In other embodiments, one or more floor-mounted burners 12 may emit combustion products into the melt at an angle to floor 2, where the angle may be more or less than 45 degrees, but in certain embodiments may be 30 degrees, or 40 degrees, or 50 degrees, or 60 degrees, or 70 degrees, or 80 degrees. Burners 12 may be air-fuel burners or oxy-fuel burners, or some combination thereof, as further described herein. Embodiment 100 further includes a melter exit structure 22 for discharging the molten glass or similar material 24 including a plurality of gaseous bubbles 16 directly into a forehearth 26. Melter exit structure 22 is positioned generally downstream of melter turbulent zone 14 as illustrated of FIG. 2, and may or may not be mechanically connected to forehearth 26. No molten glass conditioning channel is included between melter exit structure 22 and forehearth 26 in embodiment 100, but this may not be true in all embodiments, as embodiment 100 is configured to manufactured foamed glass articles. Completing system 100 are one or more bushings on a lower portion of forehearth 26, system 100 having three bushings 28, 30, and 32, for producing hollow fibers, or fibers having regions substantially devoid of glass. Other glass forming operations may be fed by the SCM, this being merely an example arrangement.

Figure 3:
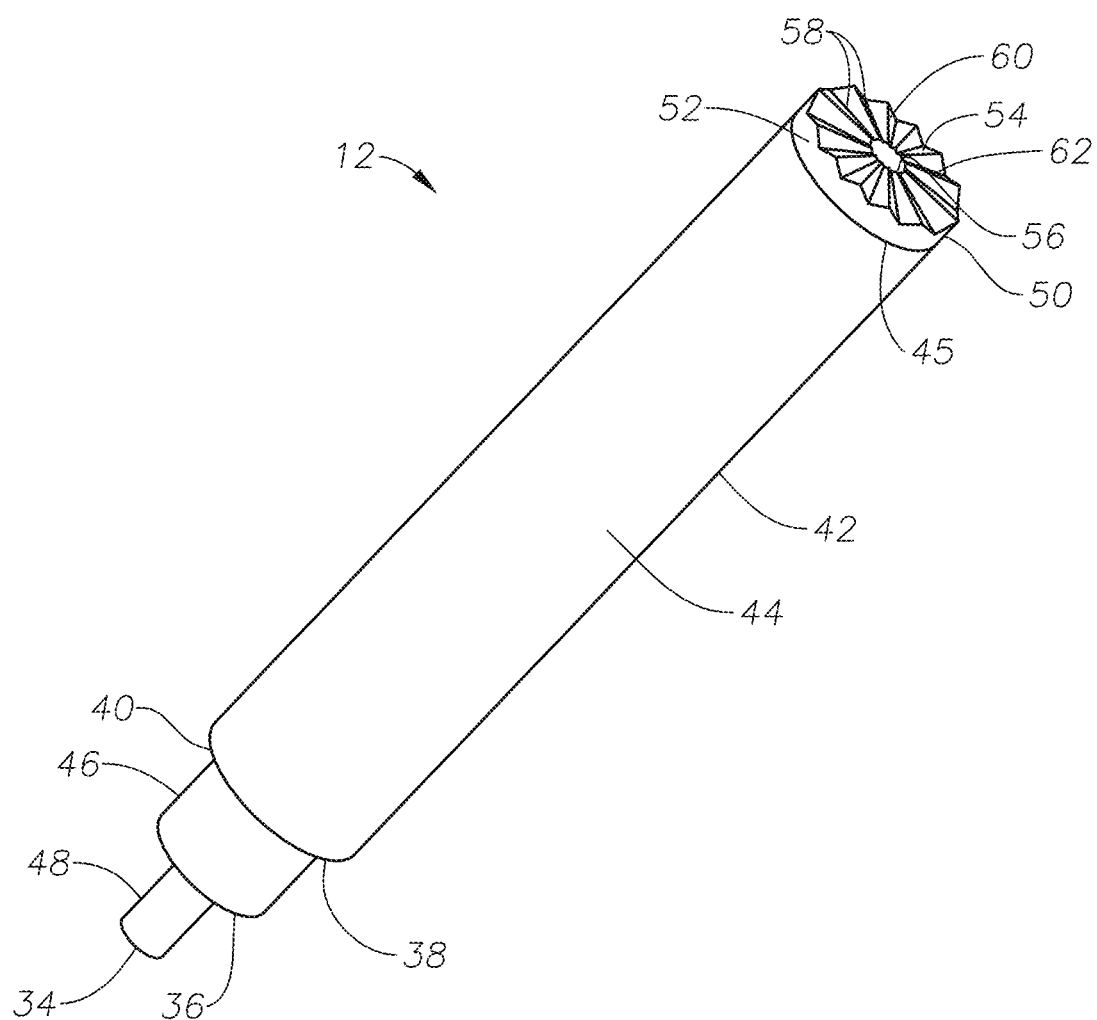
FIG. 3 is a schematic perspective view of one embodiment of an SC burner and burner tip in accordance with the present disclosure.

FIG. 3 is a schematic perspective view of one embodiment of an SC burner 12 and burner tip 50 in accordance with the present disclosure. SC burner 12 includes a burner body 42 including an external conduit 44, a generally concentric first internal conduit 46 and generally concentric second internal conduit 48, with one or more fuel inlet ports 34, and one or more oxidant inlet ports 36, as well as coolant fluid inlet and outlets 38, 40. It will be understood by those of skill in this art that fuel inlet port 34 and oxidant inlet port 36 may be reversed, that is, port 34 may admit flow of oxidant, and inlet port 36 may admit flow of fuel, and that multiple ports for each fluid may be present in given embodiments. Still referring to FIG. 3 and FIG. 4, distal ends 76, 78 of conduits 44 and 46 may be attached to outer and inner walls 68, 70 using a brazing composition 45. The techniques of brazing and the compositions of braze material 45, burner body 42, and burner tip 50 are not critical to the present disclosure, but generally burner body 42 and burner tip 50 will be the same or different metallic materials, and the braze composition chosen accordingly. Burner tip 50 may be attached to burner body 42 by other techniques, such as flanges, interference fittings, and the like, or some combination of two or more of these. Burner tip 50 includes a burner tip body 52 including a crown 54 defined by a series of generally radial convolutions 58 forming ridges 60 and troughs 62. Burner tip body 52, as perhaps better viewed in FIG. 4, defines a generally central through passage 56.

Figure 4:
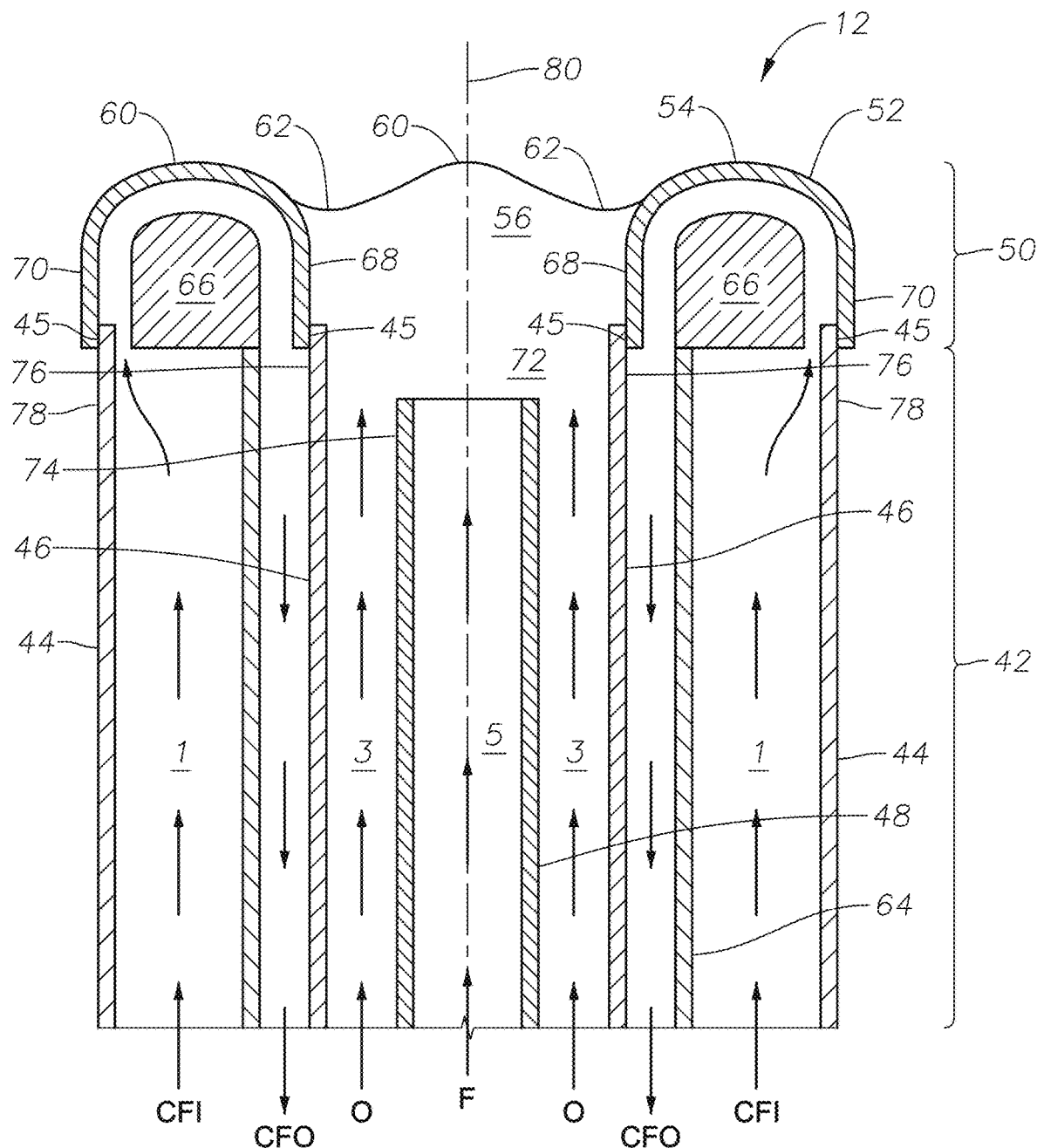
FIG. 4 is a schematic cross-sectional view of a top portion of the SC burner and burner tip illustrated schematically in FIG. 3.

FIG. 4 is a schematic cross-sectional view of a top portion of SC burner 12 having a longitudinal axis 80, illustrating burner body 42 and burner tip body 50 brazed together or otherwise connected at areas 45. Burner tip body 52 further includes an inner wall 68 and an outer wall 70 connected by crown 54. The locations of braze areas 45 may be different in other embodiments, depending on the lengths of walls 68, 70. Burner tip body 52 may be a single piece construction as illustrated, made for example by a net-shape cast method employing rapid prototype (RP) molds or some other method, or crown 54 could be a separate piece attached to walls 68, 70, for example by brazing, interference fittings, flanges, or some combination of two or more of these. Net-shape casting using various RP methods are discussed further herein. Burner 12 may further include a burner tip insert 66 and a third internal conduit 64 attached thereto, third internal conduit 64 generally concentric with external conduit 44 and first and second internal conduits 46, 48. As illustrated in FIG. 4, burner embodiment 12 thus has a first annulus 1 and a second annulus 3. First annulus 1 allows a cool heat transfer fluid to enter the burner, as indicated at "CFI" (cooling fluid in) and exit the burner as indicated at "CFO" (cooling fluid out), with heat being transferred from the molten glass (not illustrated) through outer conduit 44 and burner tip body 52 to the heat transfer fluid. Outside of the burner the warmed heat transfer fluid is then cooled to be reused. As may also be seen, burner embodiment 12 defines a mixing region 72 where fuel "F" and oxidant "O" mix, the mixing region 72 being partially formed by though passage 56 through burner tip body 52. Embodiment 12 illustrates fuel emanating from distal end 74 of second internal conduit 48, and oxidant traversing through second annulus 3, however, as mentioned herein, these flows could be changed so that fuel traverses annulus 3 and oxidant traverses through conduit 48.

Figure 5:
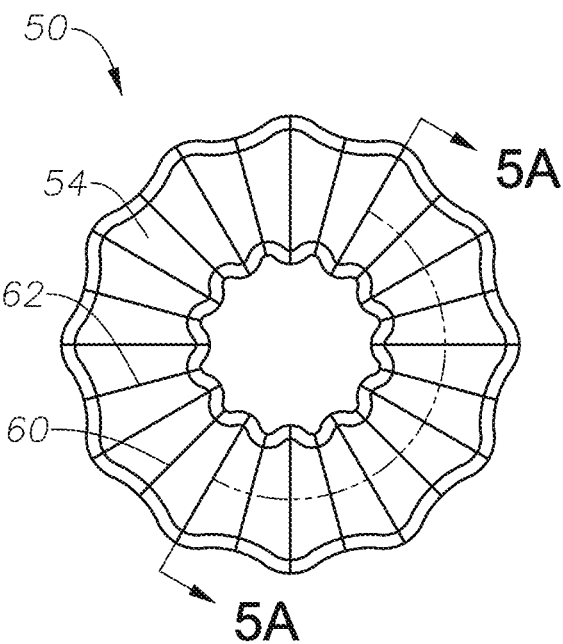
FIG. 5 is a schematic plan view.
Figure 5A:
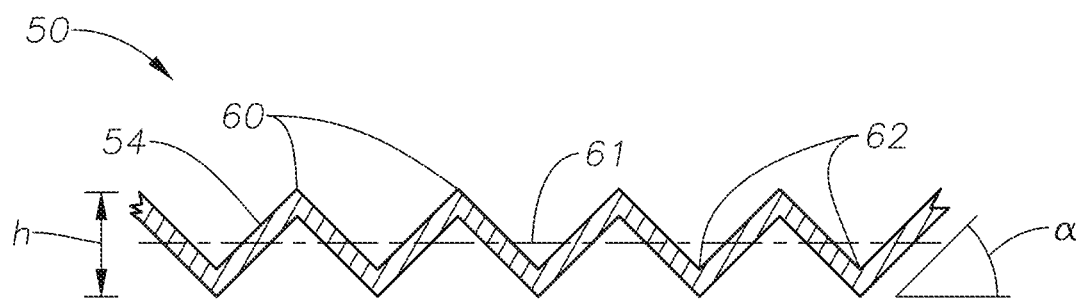
FIG. 5A is a cross-sectional view taken along line "5A-5A", of the crown of the SC burner tip illustrated schematically in FIG. 4, and FIGS. 5B-5F are cross-sectional views of five non-limiting alternative embodiments of burner tip crowns in accordance with the present disclosure, all embodiments having a plurality of radial convolutions.
Figure 5B:
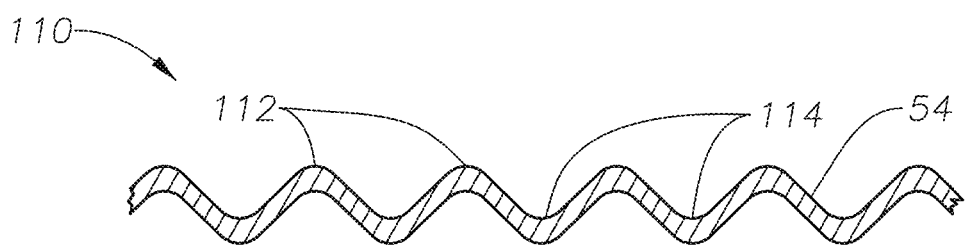
Figure 5C:
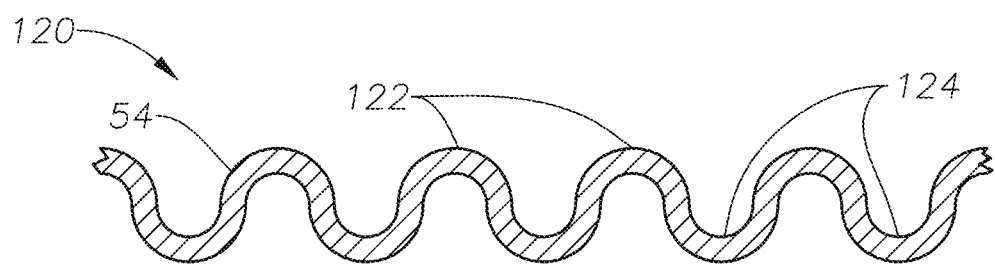
Figure 5D:
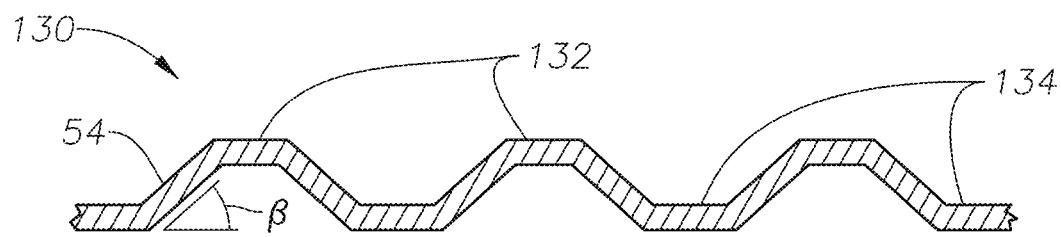
Figure 5E:
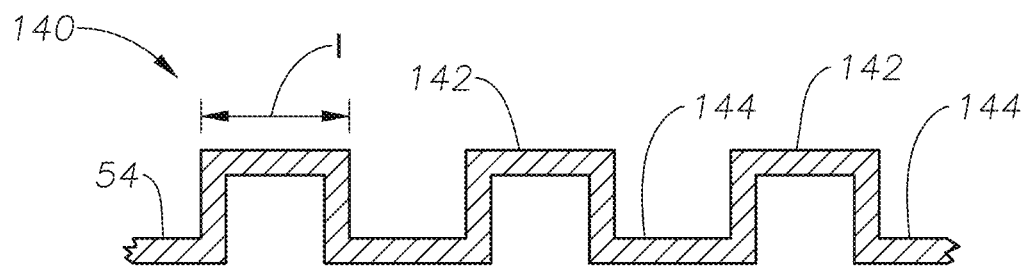
Figure 5F:
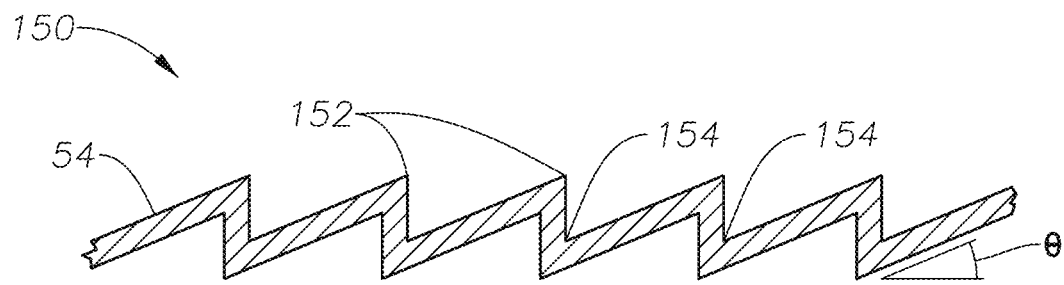

FIG. 5 is a schematic plan view, and FIG. 5A is a cross-sectional view taken along line "5A-5A", of the crown 54 of SC burner tip 50 illustrated schematically in FIG. 4. Embodiment 50 is essentially a triangular pattern of alternating radial ridges 60 and troughs 62, where the sides of the triangles are positioned at an angle "α" to a line 61 perpendicular to burner longitudinal axis 80. It is not necessary that all sides have the same angle "α", or that the triangles all have same height "h", however embodiments with the same angle and height may be easier to manufacture. Angle "α" may range from about 20 to about 80 degrees, or from about 40 to about 60 degrees, and height "h" may range from about 0.5 cm to about 3 cm.

FIGS. 5B-5F are cross-sectional views of five non-limiting alternative embodiments of burner tip crowns in accordance with the present disclosure, all embodiments having a plurality of radial convolutions. Embodiment 110 of FIG. 5B has a more or less sinusoidal pattern of radial alternating ridges 112 and troughs 114. As with embodiment 50, the height or amplitude of the ridges may be the same or different from ridge to ridge, and the distance between ridges may be the same or different from ridge to ridge. Embodiment 120 of FIG. 5C may be interpreted as a series of semicircular ridges 122 and troughs 124. The height or radius of the ridges may be the same or different from ridge to ridge, as may be distance between ridges. Embodiment 130 of FIG. 5D may be described as a pattern of radial alternating trapezoidal ridges 132 and troughs 134. The height of ridges 132 and angle "β" of the sides may be the same or different from ridge to ridge, as may be distance between ridges. The angle "β" may range from about 20 to about 80 degrees, or from about 40 to about 60 degrees. Embodiment 140 of FIG. 5E may be described as an alternating radial pattern of rectangular ridges 142 and troughs 144. The height and length of ridges 142 may be the same or different from ridge to ridge. The height may have the same range as the height "h" of embodiment 50, while the length of ridges 142 may range from about 0.3 cm to about 3 cm. Embodiment 150 of FIG. 5F may be described as a sawtooth pattern of radial alternating ridges 152 and troughs 154. The height of ridges 152 and angle "θ" of the sides may be the same or different from ridge to ridge, as may be distance between ridges. The angle "θ" may range from about 20 to about 80 degrees, or from about 40 to about 60 degrees, while the height "h" may have a range similar to embodiment 50 (FIG. 5A).

The thickness of crown 54 in the various embodiments illustrated herein is not critical, and need not be the same for every region of the crown. Suitable thickness may range from about 0.1 cm to about 1 cm. Thicker crowns or thicker regions of crowns will generally be stronger and exhibit more fatigue resistance, but may be more difficult to form convolutions, and thus have less surface area.

Figure 6A:
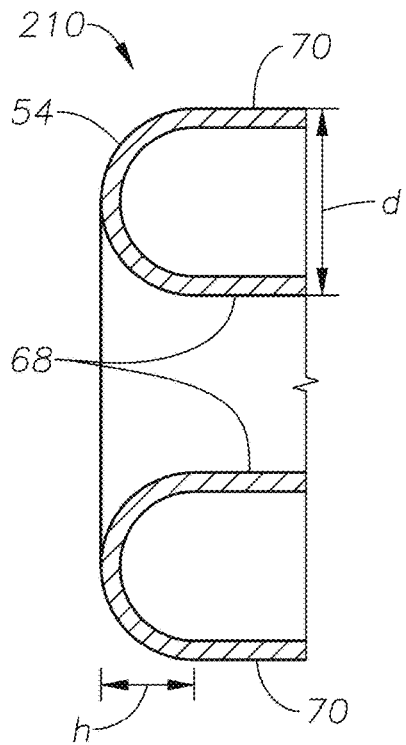
FIGS. 6A-6H are schematic cross-sectional views of eight non-limiting burner tip embodiments in accordance with the present disclosure, illustrating some of the different shapes of burner tips possible in accordance with the present disclosure, and upon which one or more convolutions may be superimposed.
Figure 6B:
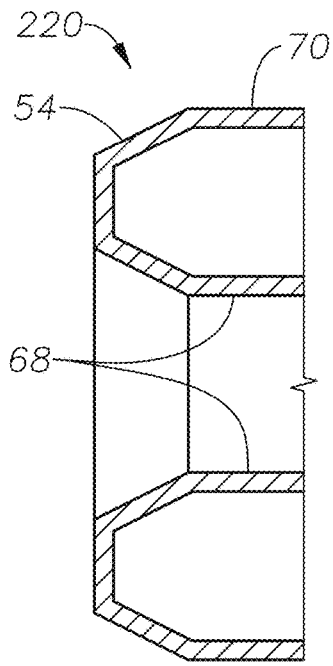
Figure 6C:
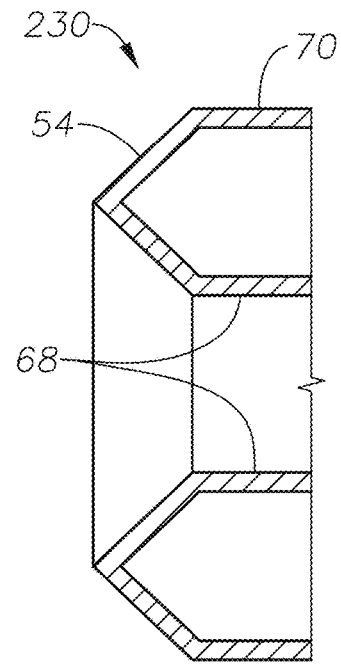
Figure 6D:
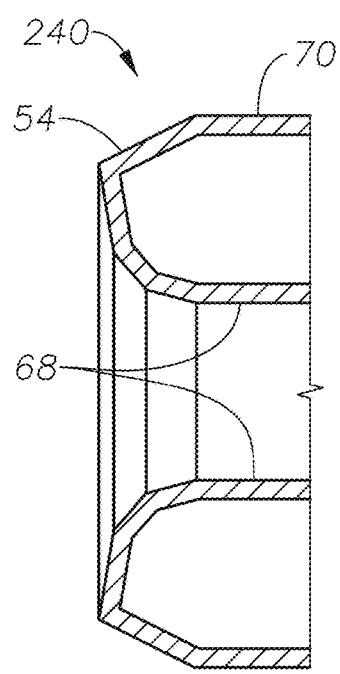
Figure 6E:
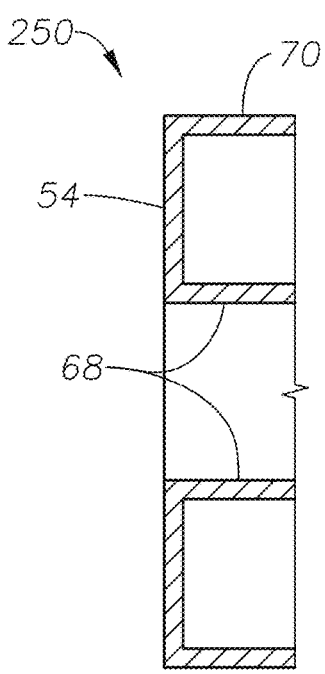
Figure 6F:
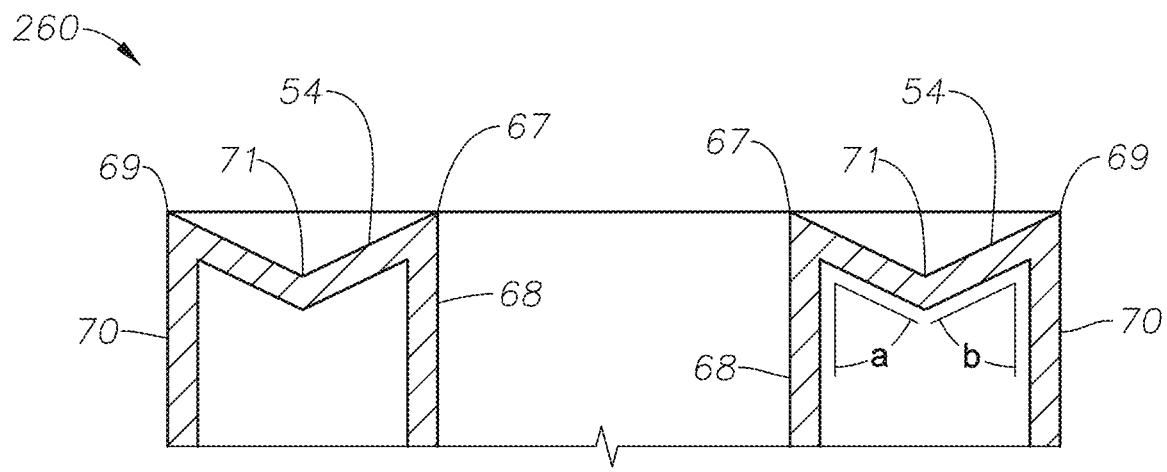
Figure 6G:
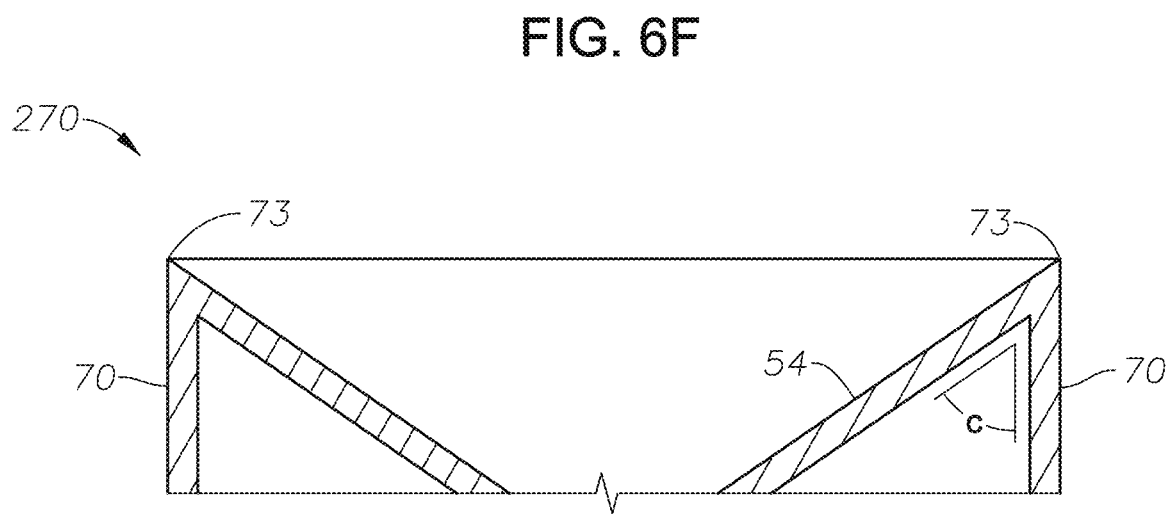
Figure 6H:
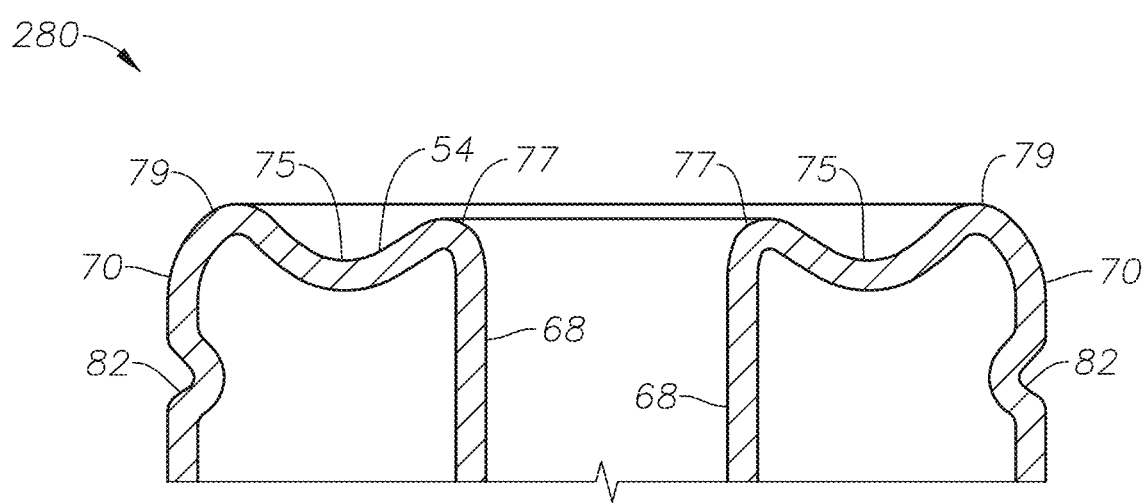

FIGS. 6A-6H are schematic cross-sectional views of eight non-limiting burner tip embodiments in accordance with the present disclosure, illustrating some of the different shapes of burner tips possible in accordance with the present disclosure, and upon which one or more convolutions of embodiments 50, 110, 120, 130, 140, and 150, or other embodiments, may be superimposed. Embodiment 210 of FIG. 6A is the current shape, where crown 54 has a hemispherical cross-section. Embodiment 220 of FIG. 6B on the other hand has a trapezoidal cross-section, embodiment 230 of FIG. 6C has a triangular cross-section, embodiment 240 of FIG. 6D has an irregular cross-section, and embodiment 250 of FIG. 6E a rectangular cross-section. Further embodiments are illustrated in FIGS. 6F-6H. For example, embodiment 260 of FIG. 6F has inner and outer circumferential ridges 67, 69, respectively, and a single circumferential trough 71. Embodiment 270 of FIG. 6G, on the other hand, exhibits a single outer ridge 73. Another example is embodiment 280 of FIG. 6H, which has a generally concave irregular crown 54 having a single irregular circumferential trough 75 and smooth inner and outer ridges 77, 79, respectively. An additional feature of embodiment 280 is provision of a circumferential trough 82 as part of outer wall 72. Height "H" in these embodiments may range from about 0.5 cm to about 5 cm, or form about 0.5 cm to about 2.5 cm, while dimension "d" will generally depend upon the separation between external conduit 44 and first internal conduit 46 (FIG. 4), but generally may range from about 0.5 cm to about 5 cm. Angles "a" and "b" in embodiment 260 may be the same or different, and may range from about 30 to about 60 degrees. Angle "c" in embodiment 270 may range from about 30 to about 70 degrees, or from about 30 to about 50 degrees.

Figure 7A:
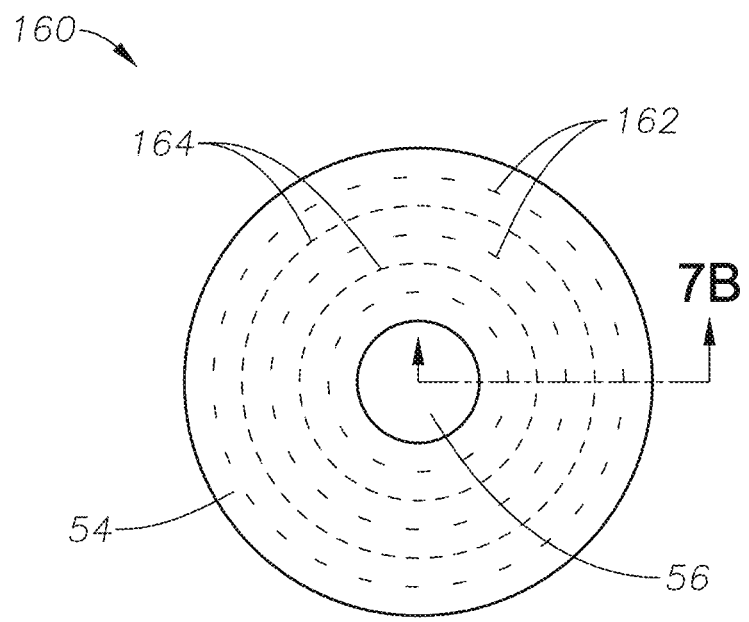
FIG. 7A is a schematic plan view.
Figure 7B:
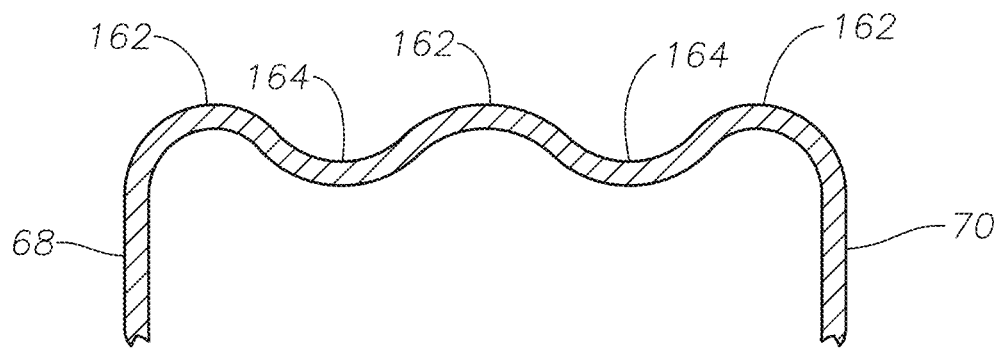
FIG. 7B is a cross-sectional view taken along line "7B-7B", of a burner tip crown having a plurality of generally concentric, constant radius circumferential convolutions.
Figure 8A:
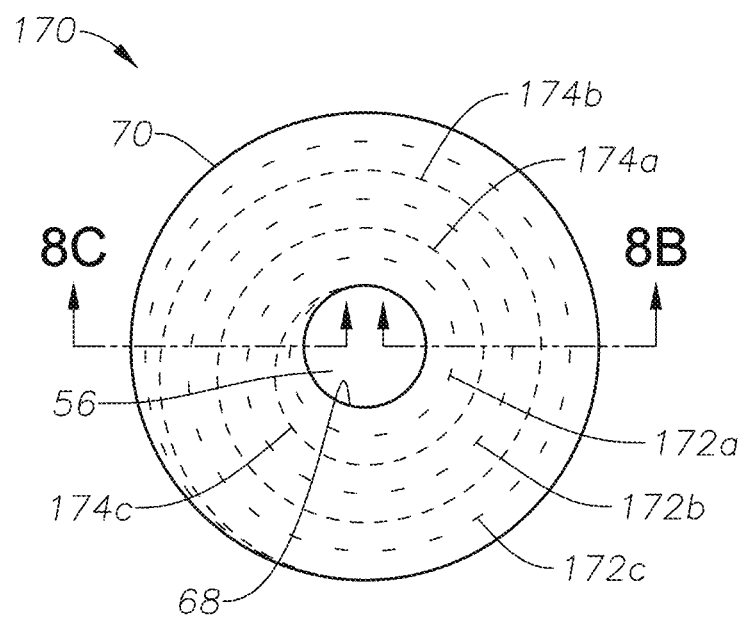
FIG. 8A is a schematic plan view.
Figure 8B:
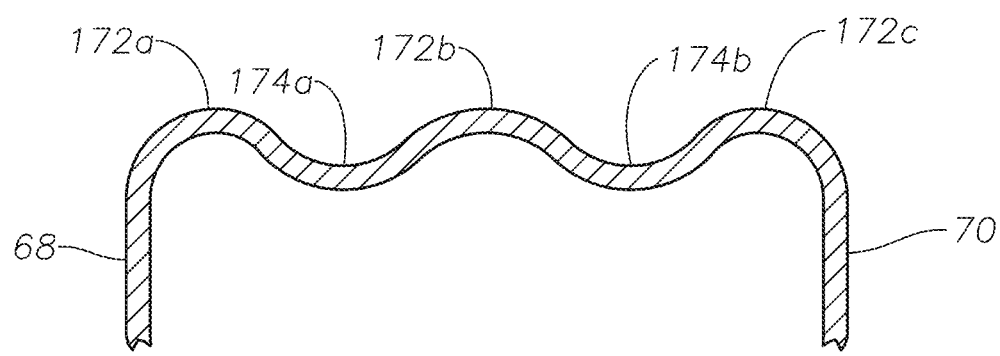
FIG. 8B is a cross-sectional view taken along line "8B-8B"
Figure 8C:
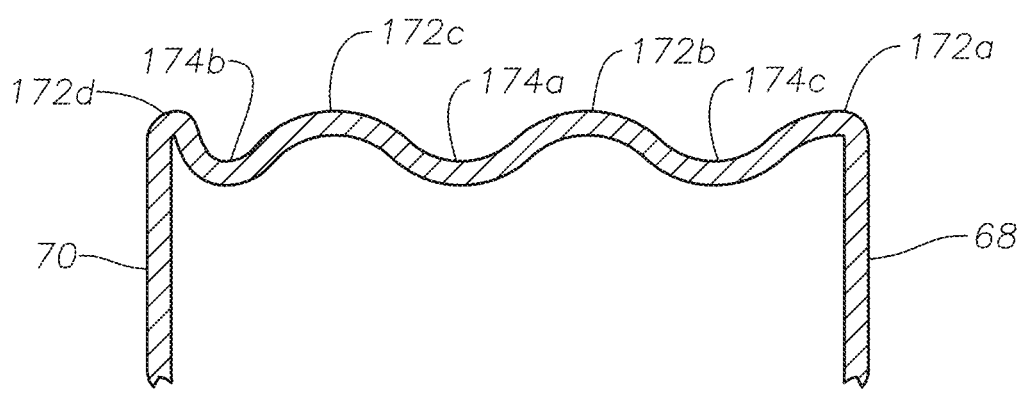
FIG. 8C is a cross-sectional view taken along line "8C-8C" of a burner tip crown having a plurality of generally concentric, non-constant radius circumferential convolutions as formed by a spiral pattern.

FIG. 7A is a schematic plan view, and FIG. 7B is a cross-sectional view taken along line "7B-7B", of a burner tip crown embodiment 160 having a plurality of generally concentric, constant radius circumferential convolutions forming ridges 162 and troughs 164. As may be seen the cross-sectional view is generally the same where ever the section is taken in embodiment 160. Contrast this with embodiment 170, on the other hand, illustrated schematically in FIGS. 8A, 8B, and 8C. FIG. 8A is a schematic plan view, FIG. 8B is a cross-sectional view taken along line "8B-8B", and FIG. 8C is a cross-sectional view taken along line "8C-8C" of a burner tip crown embodiment 170 having a plurality of generally concentric, non-constant radius circumferential convolutions as formed by a spiral pattern. As may be seen, depending upon where the cross-section is taken, there are in certain locations a pair of troughs 174a, 174b, and three ridges 172a, 172b, and 172c (FIG. 8B), while a section in another location provides four ridges 172a, 172b, 172c, and 172d, with three troughs 174a, 174b, and 174c.

Figure 9A:
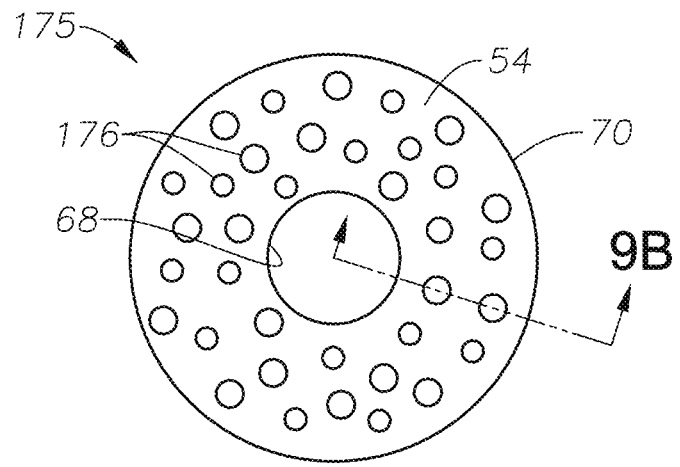
FIG. 9A is a schematic plan view.
Figure 9B:
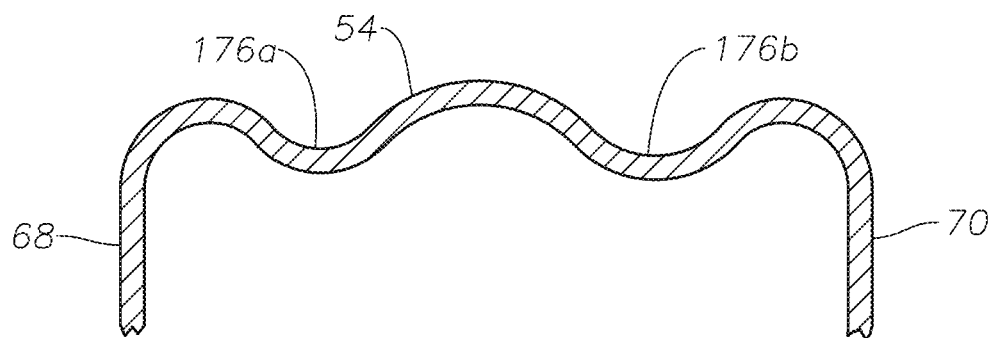
FIG. 9B is a cross-sectional view taken along line "9B-9B", of a burner tip crown having a plurality of random depressions.

FIG. 9A is a schematic plan view, and FIG. 9B is a cross-sectional view taken along line "9B-9B", of a burner tip crown embodiment 175 having a plurality of random depressions 176. As may be seen form the cross-section of FIG. 9B, depressions 176a and 176b may be differently shaped (depression 176a being smaller than depression 176b).

Figure 10:
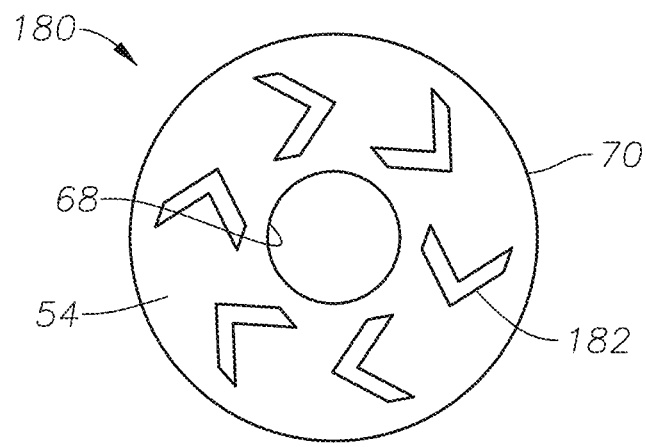
FIGS. 10-13 are schematic plan views of four other non-limiting embodiments of burner tip crowns in accordance with the present disclosure.
Figure 11:
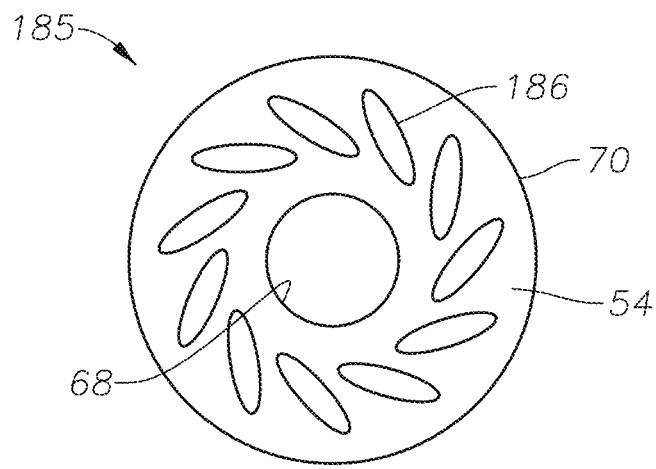
Figure 12:
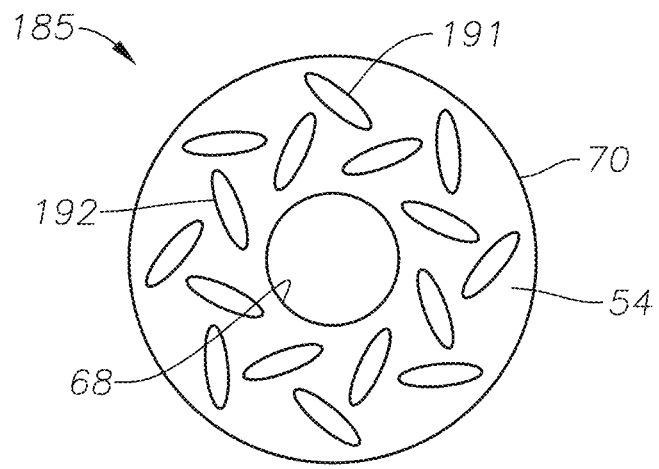

FIGS. 10-13 are schematic plan views of four other non-limiting embodiments of burner tip crowns in accordance with the present disclosure. FIG. 10 illustrates an embodiment 180 exhibiting a single row of chevron depressions 182. Embodiment 185 of FIG. 11 exhibits a single row of oblique oval depressions 186, and embodiment 190 of FIG. 12 a double row of oblique oval depressions 191, 192. In embodiments 180, 185, and 190, depressions 182, 186, 191, and 192 may independently have depths ranging from 0.1 cm to about 2 cm. Each depression need not be the same depth or shape in each embodiment. For example, in embodiments such as embodiment 180, chevron depressions 182 may have different depths, for example every other chevron depression may have a depth of 0.5 cm, while the remaining chevrons have a depth of 1 cm. In embodiment 190, the outer row of oblique oval depression 191 may all have the same depth, for example, 0.5 cm, while the inner row of oblique oval depressions 192 have a different depth. There are many other possible variations, but all tend to increase the surface area and fatigue resistance of crown 54.

Figure 13:
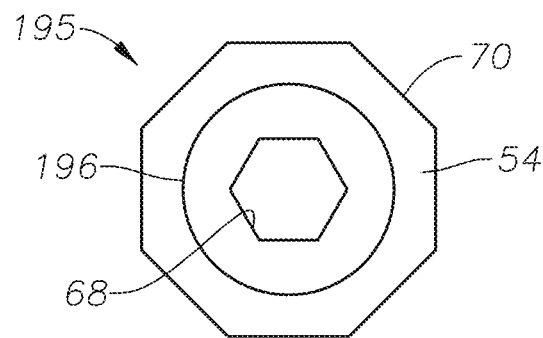

Embodiment 195 illustrated schematically in FIG. 13 exemplifies the fact that the burner body and burner tips in accordance with the present disclosure need not have circular dimensions. As illustrated in FIG. 13, embodiment 195 has an inner wall 68 having a generally hexagonal shape, and an outer wall 70 that has a generally octagonal shape. Embodiment 195 has a single circumferential depression convolution 196, but embodiments such as this may have depressions such as exhibited in the other embodiments, such as oblique ovals, circular depressions, chevrons, and the like.

Certain burner embodiments may include an adjustable, changeable and removable structure or insert connected to end 74 of second internal conduit 48 (FIG. 4), such as described in Applicant's co-pending U.S. application Ser. No. 13/268,028, filed Oct. 7, 2011. As used herein the word "changeable", when referring to a burner feature, means that that feature may be physically different from burner to burner by machining or molding, for example, while the term "adjustable" means that a feature of a burner may actually be varied without making physical modifications to the burner. Such adjustable, changeable and removable structures or inserts include a body that is adjustable in the sense that threads or other connectors to inner conduit 48 allow variation of the axial position of the insert. Furthermore, physical parameters of such inserts may be changed, and the entire insert may be removed and replaced with another insert of same or different dimensions if desired. Such inserts include a body having a central hub that is, in certain embodiments, parallel to longitudinal axis 80, but not necessarily so, and include a central passage having an exit that is, in certain embodiments, perpendicular to longitudinal axis 80, but not necessarily so. The body of such adjustable inserts may include one or more non-central passages, and fluids emanating from the central exit, which may be a fuel stream, and non-central passages, which may be oxidant streams, at least partially mix. The streams may be switched in certain embodiments (in other words, fuel may traverse one or more non-central passages while oxidant emanates from central exit). In embodiments where the oxidant flows through the central passage, the flame shape may be broader and the velocity of the combustion products lower in the vertical direction to enable more combustion and energy release lower in the molten glass pool to enhance efficiency.

Figure 14:
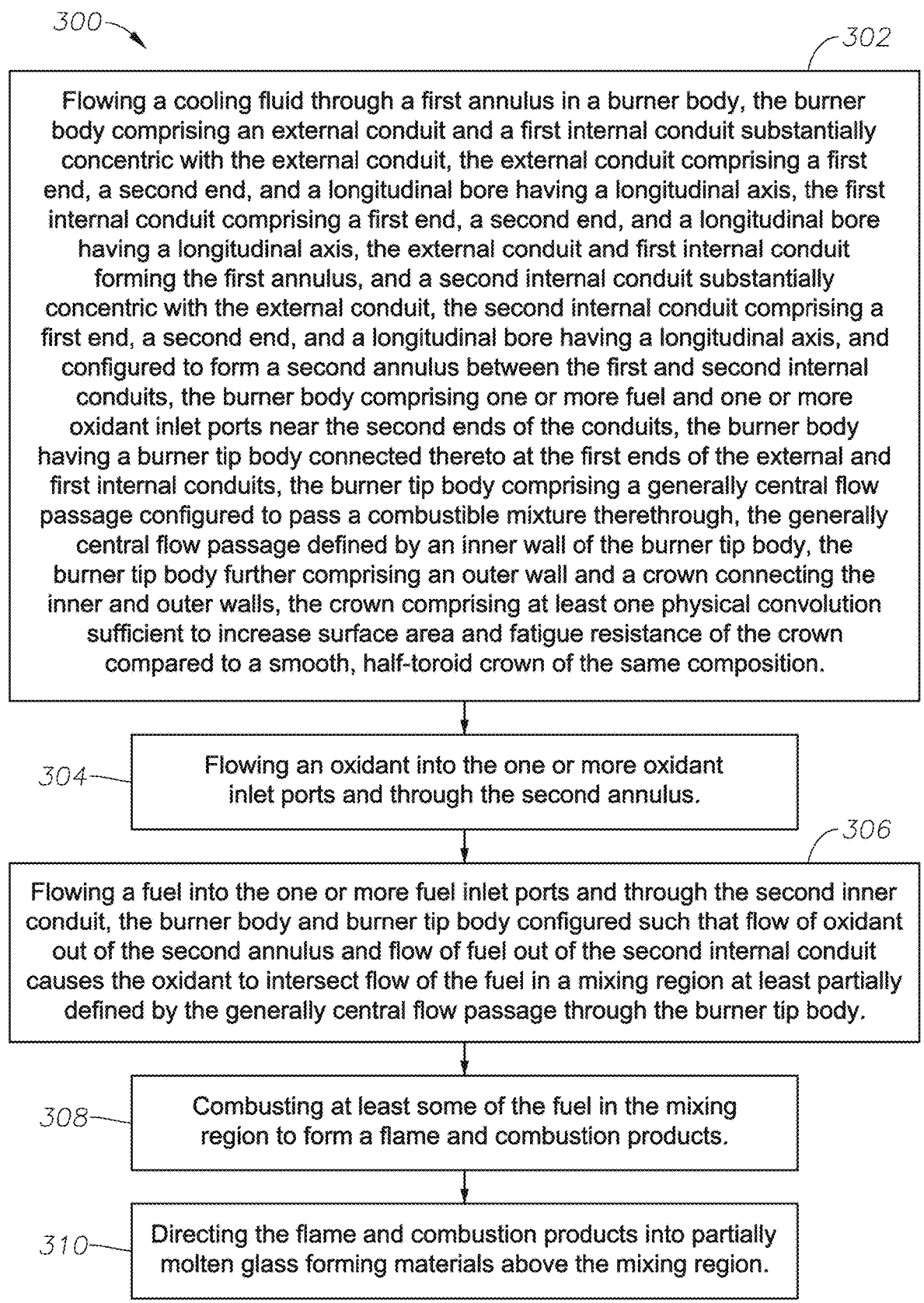
FIGS. 14 and 15 are logic diagrams of two methods in accordance with the present disclosure.
Figure 15:
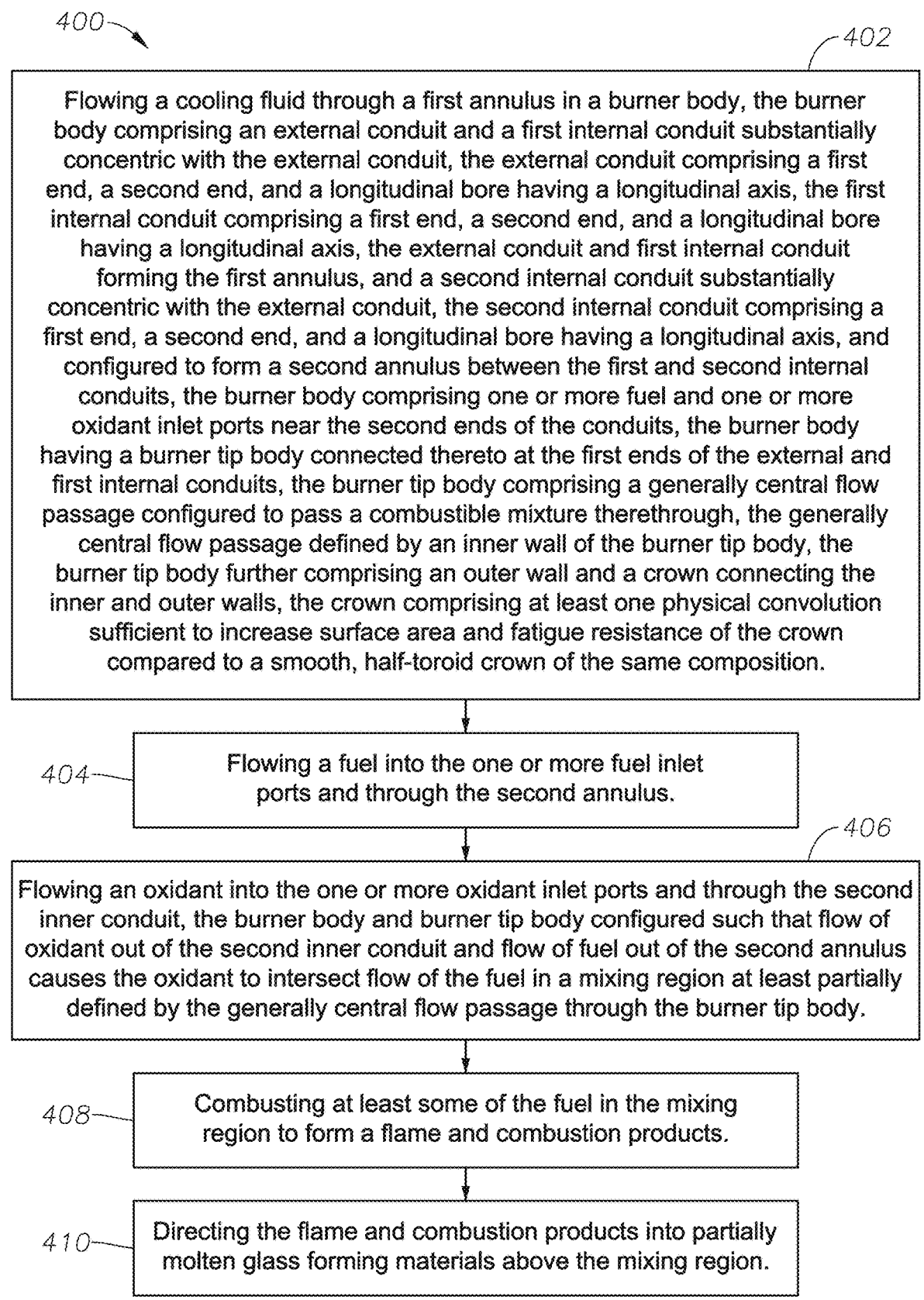

FIGS. 14 and 15 are logic diagrams of two methods in accordance with the present disclosure. Method embodiment 300 of FIG. 14 comprises (box 302) flowing a cooling fluid through a first annulus in a burner body configured as described herein, the burner body having a burner tip body connected thereto at the first ends of the external and first internal conduits, the burner tip body comprising a generally central flow passage configured to pass a combustible mixture therethrough, the generally central flow passage defined by an inner wall of the burner tip body, the burner tip body further comprising an outer wall and a crown connecting the inner and outer walls, the crown comprising at least one physical convolution sufficient to increase surface area and fatigue resistance of the crown compared to a smooth, half-toroid crown of the same composition. Method embodiment 300 further comprises flowing an oxidant into the one or more oxidant inlet ports and through the second annulus (box 304). Method embodiment 300 further comprises flowing a fuel into the one or more fuel inlet ports and through the second inner conduit, the burner body and burner tip body configured such that flow of oxidant out of the second annulus and flow of fuel out of the second internal conduit causes the oxidant to intersect flow of the fuel in a mixing region at least partially defined by the generally central flow passage through the burner tip body (box 306), combusting at least some of the fuel in the mixing region to form a flame and combustion products (box 308), and directing the flame and combustion products into partially molten glass forming materials above the mixing region (box 310).

Method embodiment 400 of FIG. 15 comprises (box 402) flowing a cooling fluid through a first annulus in a burner body configured as described herein, the burner body having a burner tip body connected thereto at the first ends of the external and first internal conduits, the burner tip body comprising a generally central flow passage configured to pass a combustible mixture therethrough, the generally central flow passage defined by an inner wall of the burner tip body, the burner tip body further comprising an outer wall and a crown connecting the inner and outer walls, the crown comprising at least one physical convolution sufficient to increase surface area and fatigue resistance of the crown compared to a smooth, half-toroid crown of the same composition. Method embodiment 400 further comprises flowing a fuel into the one or more fuel inlet ports and through the second annulus (box 404). Method embodiment 400 further comprises flowing an oxidant into the one or more oxidant inlet ports and through the second inner conduit, the burner body and burner tip body configured such that flow of oxidant out of the second inner conduit and flow of fuel out of the second annulus causes the oxidant to intersect flow of the fuel in a mixing region at least partially defined by the generally central flow passage through the burner tip body (box 406), combusting at least some of the fuel in the mixing region to form a flame and combustion products (box 408), and directing the flame and combustion products into partially molten glass forming materials above the mixing region (box 410).

Burner tips described herein may be made using a variety of processes, including molding, machining, and like processes. While the convolutions may be more complex to manufacture than the prior art smooth half-toroid burner tips, burner tips of the present disclosure may be net-shape cast (or near-net shape cast) using rapid prototype (RP) molds. The matching or substantially matching burner tip inserts may similarly be RP molded and cast of the same or substantially similar shape, thereby ensuring proper cooling water velocity just under the surface of the burner tip material (inside the crown and inner and outer walls of the burner tips). Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411. As summarized in the '411 patent, a number of technologies presently exist for the rapid creation of models, prototypes, and objects for limited run manufacturing. These technologies are generally called Solid Freeform Fabrication ("SFF") techniques. Some SFF techniques include stereolithography, selective deposition modeling, laminated object manufacturing, selective phase area deposition, multi-phase jet solidification, ballistic particle manufacturing, fused deposition modeling, particle deposition, laser sintering, film transfer imaging, and the like. Generally in SFF, complex parts are produced from a build material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a build material to fabricate the part in successive layers.

According to the '411 patent, SFF technologies may dramatically shorten the time to develop prototype parts, can produce limited numbers of parts in rapid manufacturing methods, and may eliminate the need for complex tooling and machining associated with conventional subtractive manufacturing methods, including the need to create molds for custom applications. In addition, customized parts can be directly produced from computer graphic data (e.g., computer-aided design (CAD) files) in SFF techniques. Generally, in most techniques of SFF, structures are formed in a layer by layer manner by solidifying or curing successive layers of a build material. For example, in stereolithography a tightly focused beam of energy, typically in the ultraviolet radiation band, is scanned across sequential layers of a liquid photopolymer resin to selectively cure resin of each layer to form a multilayered part. In selective laser sintering, a tightly focused beam of energy, such as a laser beam, is scanned across sequential layers of powder material to selectively sinter or melt powder in each layer to form a multilayered part. In selective deposition modeling, a build material is jetted or dropped in discrete droplets, or extruded through a nozzle, such that the build material becomes relatively rigid upon a change in temperature and/or exposure to actinic radiation in order to build up a three-dimensional part in a layerwise fashion. In another technique, film transfer imaging ("FTI"), a film transfers a thin coat of resin to an image plane area where portions of the resin corresponding to the cross-sectional layer of the part are selectively cured with actinic radiation to form one layer of a multilayer part. Certain SFF techniques require the part be suspended from a supporting surface such as a build pad, a platform, or the like using supports that join the part to the supporting surface. Prior art methods for generating supports are described in U.S. Pat. Nos. 5,595,703; 6,558,606; and 6,797,351.

The Internet website of Quickparts.com, Inc., Atlanta, Ga., a subsidiary of 3D Systems Inc., has more information on some of these techniques and materials that may be used. This website explains that stereolithography ("SLA") is a rapid prototyping process that typically uses a vat of liquid UV-curable photopolymer resin and a UV laser to build parts one layer at a time, and that SLA is often considered the pioneer of the RP industry, with the first commercial system introduced in 1988 by 3D Systems. The system consists of an Ultra-Violet Laser, a vat of photo-curable liquid resin, and a controlling system. A platform is lowered into the resin (via an elevator system), such that the surface of the platform is a layer-thickness below the surface of the resin. The laser beam then traces the boundaries and fills in a two-dimensional cross section of the model, solidifying the resin wherever it touches. Once a layer is complete, the platform descends a layer thickness, resin flows over the first layer, and the next layer is built. This process continues until the model is complete. Once the model is complete, the platform rises out of the vat and the excess resin is drained. The model is then removed from the platform, washed of excess resin, and then placed in a UV oven for a final curing. Smoothing the "stair-steps" then finishes the stereolithography model. According to his website, currently the maximum dimensions for parts produced in this manner are 25 inches×25 inches×21 inches (64 cm×64 cm×53 cm), but parts with larger dimensions may also be produced. Stereolithography material choices include technician's choice, semi-flexible, polyethylene ("PE")-like compositions, such as those known under the trade designation SOMOS 8110; durable, polypropylene ("PP")-like/acrylonitrile-butadiene-styrene ("ABS")-like compositions such as those known under the trade designations ACCURA 25 and SOMOS 9420; ABS-like compositions such as those known under the trade designations ACCURA XTREME, ACCURA 55, RENSHAPE 7811, RENSHAPE 7820, and SOMOS 18420; high-impact ABS-like compositions such as those known under the trade designation SOMOS NeXt; rigid, polycarbonate ("PC")-like compositions such as those known under the trade designations ACCURA 60, SOMOS 11122, and ACCURA CLEARVUE; high-temperature ABS-like compositions such as those known under the trade designation ACCURA BLUESTONE; high temperature PC-like, rigid compositions such as those known under the trade designation ACCURA PEAK; and high resolution, ABS-like, durable, rigid compositions such as those known under the trade designation ACCURA XTREME.

As noted in the Quickparts.com, Inc. website, standard stereolithography tolerances are currently +/−0.005 inch (0.013 cm) for the first inch (first 2.5 cm), and +/−0.002 inch (0.005 cm) on every inch (2.5 cm) thereafter. In the z height (vertical), standard tolerances range from +/−0.01 inch (0.025 cm) for the first inch (first 2.5 cm), +/−0.002 inch (0.005 cm) on every inch (2.5 cm) thereafter. Stereolithography layer thicknesses depend on the resolution, but for high-resolution range from 0.002 to 0.004 inch (0.005 cm to 0.01 cm); for standard resolution range from 0.005 to 0.006 inch (0.013 to 0.015 cm). Nickel-plating may provide added strength, waterproofing, and electrical conductivity to stereolithography prototypes.

As further noted in the Quickparts.com, Inc. website, Selective Laser Sintering ("SLS") is a rapid prototyping process that uses a high power laser to fuse small particles of powder to build parts one layer at a time to form a solid model. The system typically consists of a laser, part chamber, and control system. The part chamber typically consists of a build platform, powder cartridge, and leveling roller. A thin layer of build material is spread across the platform where the laser traces a two-dimensional cross section of the part, sintering the material together. The platform then descends a layer thickness and the leveling roller pushes material from the powder cartridge across the build platform, where the next cross section is sintered to the previous. This continues until the part is completed. Once the model is complete, it is removed from the part chamber and finished by removing any loose material and smoothing the visible surfaces. This technique is capable of producing snap fits and living hinges. According to his website, currently the maximum dimensions for parts produced in this manner are 28 inches×19 inches×19 inches (72 cm×48 cm×48 cm), but parts with larger dimensions may also be produced. SLS material choices include nylon compositions such as those known under the trade designation DURAFORM PA; glass-filled nylon compositions such as those known under the trade designation DURAFORM GF; and flame retardant nylon compositions and durable nylon compositions such as those known under the trade designation DURAFORM EX. As reported on this website, standard tolerances are +1-0.005 inch (0.0013 cm) for the first inch (first 2.5 cm), and +1-0.003 inch (0.008 cm) for each additional inch (2.5 cm). In the z height (vertical), standard tolerances of +1-0.01 inch (0.03 cm) for the first inch (first 2.5 cm), +1-0.003 inch (0.008 cm) on every inch (2.5 cm) thereafter. Layer thicknesses are typically 0.004 inch (0.01 cm). The products made by SLS are said to exhibit high-heat chemical resistance.

As further noted in the Quickparts.com, Inc. website, Fused Deposition Modeling ("FDM") is a rapid prototyping process that uses a plastic filament of material supplied to an extrusion nozzle. The nozzle is heated to melt the material and can be moved in both horizontal and vertical directions, extruding material, layer-by-layer, to build a model. The systems typically consist of a build platform, extrusion nozzle, and control system. The build material, a production quality thermoplastic, is melted and then extruded through a specially designed head onto a platform to create a two-dimensional cross section of the model. The cross section quickly solidifies, and the platform descends where the next layer is extruded upon the previous layer. This continues until the model is complete, where it is then removed from the build chamber and cleaned. According to his website, currently the maximum dimensions for parts produced in this manner are 20 inches×20 inches×20 inches (51 cm×51 cm×51 cm), but parts with larger dimensions may also be produced. Material choices include production-quality ABS (red, yellow, green, blue, gray, steel gray, white, and black); compositions such as those known under the trade designation ABS-M30 (white, red, blue, and gray); polycarbonate (white); PC-ABS (black), and compositions such as those known under the trade designation PC-ISO (white and translucent), ULTEM, and PPSF (tan). Dimensional tolerances are +/−0.005 inch (0.013 cm) for the first inch (first 2.5 cm), and +/−0.002 inch (0.005 cm) for each additional inch (2.5 cm). In the z height (vertical), standard tolerances of +/−0.01 inch (0.03 cm) for the first inch (first 2.5 cm), +/−0.002 inch (0.005 cm) on every inch (2.5 cm) thereafter. Layer thickness depends on resolution; for standard resolution, 0.01 inch (0.03 cm). Minimum wall thickness is 0.02 inch (0.06 cm).

As further noted in the Quickparts.com, Inc. website, the process known under the trade designation POLYJET is a rapid prototyping process that jets photopolymer materials in ultra-thin layers (16 micrometers) onto a build tray layer by layer until the part is completed. Each photopolymer layer is cured by UV light immediately after it is jetted. This is indicated to be a new RP process that provides a quick turn around for smooth, fully cured parts. The process typically consists only of UV bulbs and photopolymer materials, and the machines may fully cure each layer of super fine UV photopolymer and support materials as eight jetting heads precisely deposit the product. Support materials are indicated to be easily separated from the part by either a water jet or hand and brush. No special baths or extra finishing treatments are needed. Finished parts can readily absorb paint and can also be machined, drilled, chrome-plated or used as molds. According to his website, currently the maximum dimensions for parts produced in this manner are 19.3 inches×15.4 inches×7.9 inches (49 cm×39 cm×20 cm), but parts with larger dimensions may also be produced. Material choices include compositions such as those known under the trade designations 61A elastomeric TANGOBLACK, also available as POLYJET FC970; 75A elastomeric TANGOGRAY, also available as POLYJET FC950; elastomeric/rubber-like TANGOPLUS, also available as POLYJET FC930; high-resolution, rigid, translucent compositions such as those known under the trade designation POLYJET FC720; high-resolution, rigid compositions such as those known under the trade designation VEROBLUE, also available as POLYJET FC840; high-resolution, rigid compositions such as those known under the trade designation VEROWHITE, also available as POLYJET FC830; high-resolution, rigid compositions such as those known under the trade designation VEROBLACK, also available as POLYJET FC830; and PP-like compositions such as those known under the trade designation DURUS WHITE (FC430). Standard tolerances are disclosed as being +/−0.005 inch (0.013 cm) for the first inch (first 2.5 cm), +/−0.002 inch (0.005 cm) on every inch (2.5 cm) thereafter. In the z height (vertical), standard tolerances are noted as being +/−0.01 inch (0.03 cm) for the first inch (first 2.5 cm), +/−0.002 inch (0.005 cm) on every inch (2.5 cm) thereafter. Layer thickness is noted as being as little as 16 micrometers (0.0006 inch).

In operation of burners of the disclosure, in exemplary embodiments oxidant may be fed to the second annulus 3, and a fuel to the longitudinal bore 5 of second internal conduit 48. An inorganic glass-forming material is charged to the melter. The mass flow rate of the inorganic material, for example glass, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in mixing region 72, after the gases have passed over a flame arrestor safety device. Varying the oxygen content of the oxidant can control the flame temperature of the combustion gases.

In general, the second internal conduit 48 may have an inner diameter (ID) ranging from about 1 inch up to about 5 inches (2.5 cm to 13 cm), or from about 2 inches up to about 4 inches (5 cm to 10 cm).

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on a melter wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 72 of burners in accordance with the present disclosure should not exceed about 10 psig (170 kPa absolute pressure).

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 48, in addition to a secondary oxidant injection in annulus 3.

SC burners and methods of the present disclosure are intended to be used, for example, to replace combustion burners in already existing SCMs, and/or to be used as the main source of energy in new SCMs.

Burner tips, conduits used in burners, and adjustable, changeable, removable bodies used in burners of the present disclosure may be comprised of metal, ceramic, ceramic-lined metal, or combination thereof. Suitable metals include stainless steels, for example, but not limited to, 306, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight of the burners. Threaded connections may eliminate the need for 3rd party forgings and expensive welding or brazing processes—considerably improving system delivery time and overall cost. It will be understood, however, that the use of 3rd party forgings, welding, and brazing are not ruled out for burners described herein, and may actually be preferable in certain situations. The skilled artisan, having knowledge of the particular application, pressures, temperatures, and available materials, will be able design the most cost effective, safe, and operable burners for each particular application without undue experimentation.

If ceramic materials are used, suitable materials may include fused zirconia (ZrO2), fused cast AZS (alumina-zirconia-silica), rebonded AZS, or fused cast alumina (Al2O3). The choice of a particular material is dictated among other parameters by the chemistry, pressure, and temperature of fuel and oxidant used and type of glass melt to be produced.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near—real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures, materials, and acts described herein as performing the recited function and not only structural equivalents, but also equivalent structures.

What is claimed is:

1. An internally fluid-cooled submerged combustion burner comprising:

a burner body comprising an external conduit and a first internal conduit substantially concentric with the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with the external conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits; and a burner tip outer wall operably connected to the burner body at the first end of the external conduit and a burner tip inner wall operably connected to the burner body at the first end of the first internal conduit, the burner tip comprising a generally central flow passage configured to pass a combustible mixture therethrough, the generally central flow passage defined by the burner tip inner wall, where fuel and oxidant intersect in a mixing region at least partially defined by the generally central flow passage through the burner tip, the burner tip further comprising a crown connecting the burner tip inner and outer walls, the crown defined by a pattern of radial alternating ridges and troughs.

2. The fluid-cooled combustion burner of claim 1 comprising a burner tip insert positioned in an internal space defined by the burner tip, the insert configured so that a cooling fluid may pass between internal surfaces of the burner tip and an external surface of the insert.

3. The fluid-cooled combustion burner of claim 2 comprising a third internal conduit generally concentric with the external conduit and positioned between the external and the first internal conduits, a first end of the third internal conduit attached to the insert.

4. The fluid-cooled combustion burner of claim 1 wherein the inner and outer walls of the burner tip extend beyond the first end of the second internal conduit.

5. A submerged combustion melter comprising:

a floor, a roof, and a sidewall structure connecting the floor and roof defining an internal space, at least a portion of the internal space comprising a melting zone; and one or more internally fluid-cooled submerged combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone;

at least one of the combustion burners being an internally fluid-cooled submerged combustion burner comprising:

a burner body comprising an external conduit and a first internal conduit substantially concentric with the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with the external conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits; and a burner tip outer wall operably connected to the burner body at the first end of the external conduit and a burner tip inner wall operably connected to the burner body at the first end of the first internal conduit, the burner tip comprising a generally central flow passage configured to pass a combustible mixture therethrough, the generally central flow passage defined by the burner tip inner wall, where fuel and oxidant intersect in a mixing region at least partially defined by the generally central flow passage through the burner tip, the burner tip further comprising a crown connecting the burner tip inner and outer walls, the crown defined by a pattern of radial alternating ridges and troughs.

* * * * *